United States Patent [19]

Clancy et al.

[11] 3,941,045

[45] Mar. 2, 1976

[54] APPARATUS FOR PULPING, SLICING AND/OR DESTONING VEGETABLES AND FRUITS

[76] Inventors: John Mathew Clancy, 4/58 Mckenzie Ave., Wollongong, N.S.W. 2500; Rodney William Howard, 4/35 Virginia St., North Wollongong 2500; Brian Leslie Wiese, 12 Macquarie St., Wollongong, N.S.W.; Richard Eben Hipsley, 1/26 Waitangi St., Gwynneville, N.S.W. 2500; Christopher Patrick Kennedy, 4/58 McKenzie Ave., Wollongong, N.S.W. 2500, all of Australia

[22] Filed: Sept. 14, 1973

[21] Appl. No.: 397,298

[30] Foreign Application Priority Data

Sept. 25, 1972 Australia.............................. 557/72

[52] U.S. Cl. ................................................ 99/556
[51] Int. Cl.² ........................................... A23N 4/22
[58] Field of Search .................. 99/556, 565; 83/403

[56] References Cited

UNITED STATES PATENTS

| 2,516,963 | 8/1950 | Derbenwick | 99/565 |
| 2,923,337 | 2/1960 | Jouin | 83/403 |
| 3,139,127 | 6/1964 | Urschel | 83/403 X |

*Primary Examiner*—Harvey C. Hornsby
*Assistant Examiner*—Alan Cantor
*Attorney, Agent, or Firm*—Richards, Harris and Medlock

[57] ABSTRACT

Apparatus for pulping, slicing and/or destoning fruit and the like comprising introducing the fruit into a rotating container provided with a plurality of radially extending tubular arms such that the fruit will be thrown outwardly along the arms to strike pulping blades extending across the arm, the pulped flesh of the fruit being thrown outwardly from the tubular arm while the stones are projected tangentially forwards by the blades which are disposed at an angle to the longitudinal axis of the arm within which they are mounted.

6 Claims, 3 Drawing Figures

APPARATUS FOR PULPING, SLICING AND/OR DESTONING VEGETABLES AND FRUITS

The present invention relates to an apparatus for pulping or slicing fruit or vegetables; which apparatus may be adapted to destone stone fruit.

Conventional mechanical fruit and vegetable slicers comprise a plurality of spaced apart blades which are moved through the articles to be sliced either while the article is stationary or while the article is moving along a conveyor band. such slicing equipment suffers from the disadvantages of low throughput and an inability to handle stone fruit such as cherries, apricots, peaches, nectarines and plums due to the fact that the stones in the fruit impede passage of the blades through fruit.

The present invention consists in apparatus for pulping or slicing fruit, vegetables, and like articles comprising a receptacle, having a base and at least one side wall, which is rotatable about its longitudinal axis, the upper end of the receptacle being open or having an opening therein, and at least one substantially tubular body opening into a, or the, side wall of the receptacle and extending radially of the axis of rotation of the receptacle, a plurality of spaced apart blades mounted within and extending across the tubular body, or each of the tubular bodies at, or adjacent, the radially outer end thereof, means being provided to rotate the receptacle.

In a preferred embodiment of the invention the blades are disposed at an angle to the longitudinal axis of the tubular body and an aperture is provided in the leading side of the wall of the tubular body adjacent, and radially inwardly of, the radially outer ends of the blades to allow egress from the tubular body of the stones of stone fruit being pulped or sliced and destoned.

It is preferred that the apparatus according to this invention be manufactured from stainless steel or some other relatively inert material in order that the sliced or pulped articles will not become contaminated through contact with the apparatus.

The blades may be parallel to one another or, if desired, a meshed arrangement of overlapped blades may be provided to ensure a higher degree of pulping. It is possible for the blades to comprise laminar knives or alternatively the blades could be comprised of wires, provided that the wires are sufficiently strong to resist to impact of the articles to be pulped or sliced.

It is believed that the very complete separation of the flesh of stone fruit from the stones achieved in the present invention is due to the fact that the Coriolis acceleration of the fruit as it moves down the tubular body forces it against the trailing side of the tubular body. As the fruit strikes the blade the centrifugal force applied to the flesh of the fruit strips it from the stone while the Coriolis acceleration forces it against the trailing side of the tubular body and away from the lateral opening in the leading side of the wall of the tubular body. The stone is forced radially outwardly and towards the leading side of the tubular body, against the Coriolis forces applied to it by the centrifugal forces acting on the stone coacting with the blades, the blades being inclined towards the opening in the forward side of the wall of the tubular body.

The separated flesh and stones are preferably separately collected, as by positioning a pair of concentric containers beneath the rotating tubular body such that stones ejected through the aperture in the leading side of the tubular body wall are guided into the inner container. The flesh of the fruit, which leaves the tubular body through its end aperture is guided into the outer container through the space between the inner and outer containers.

Rotation of the tubular member can be achieved by any suitable means of known type. Two such methods are (1) to mount the receptacle bearing the tubular body or bodies on the upper end of a spindle driven directly or indirectly from a motor, or (2) to mount the lower end of the receptacle in a bearing and to rotate it through a belt, gear or chain drive from a motor mounted laterally of the receptacle.

The articles to be pulped, sliced and/or destoned are preferably fed into the receptacle through a hopper. The articles may be fed in manually or mechanical conveyor means may be used to feed the articles into the receptacle.

The dimensions of the apparatus and the speed of rotation of the tubular bodies are selected in accordance with the type of article to be pulped, sliced and or stoned. For the destoning and pulping of fruit, particularly small fruit such as cherries a rotational speed of between 1000 and 2000 R.P.M. has been found suitable.

The blades are preferably closely spaced apart to achieve a high degree of pulping of the fruit; a spacing of ⅛ inch has been found suitable for the destoning and pulping of cherries. The spacing of the blades can be varied in accordance with the nature of the articles being sliced and the degree of pulping required.

Hereinafter given by way of example only is a preferred embodiment of the invention described with reference to the accompany drawings in which.

Figure 1:
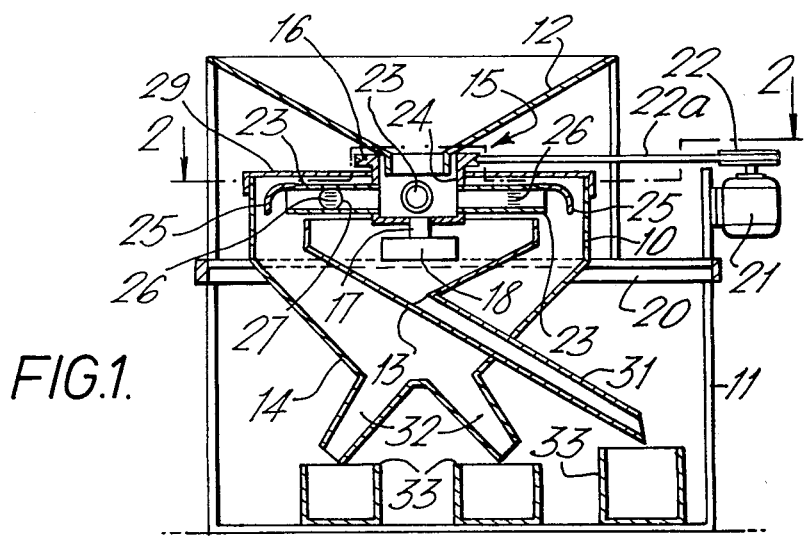
FIG. 1 is a sectional view along I–I of FIG. 2 of apparatus according to the present invention which is particularly adapted for the pulping and stoning of cherries.
Figure 2:
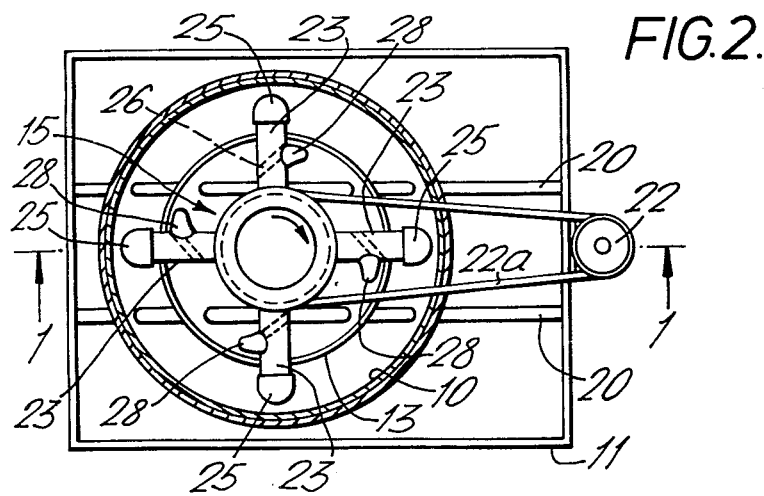
FIG. 2 is a sectional view along II–II of FIG. 1.
Figure 3:
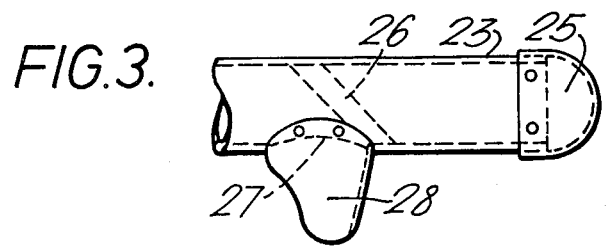
FIG. 3 is a detailed view from above of a tubular arm of the type included in the apparatus shown in FIGS. 1 and 2.

The apparatus 10 is mounted on a frame 11 and includes a hopper 12, inner and outer containers 13 and 14 respectively, and destoning unit 15.

The destoning unit 15 comprises a cylindrical container 16 mounted on a spindle 17 which is in turn mounted in a bearing 18 which is supported by bars 20 of frame 11. The upper end of the container 16 is open and is surrounded by pulley 19. The container 16 is rotated about its longitudinal axis by motor 21 mounted on frame 11. The drive of motor 21 is transmitted to the pulley 19 on the container through a drive belt 23 *a* and pulley 22 which is mounted on the motor spindle. Four radially directed tubular arms 23 extend from the side wall 24 of the receptacle 16 adjacent the base thereof. Each arm 23 is approximately 10 inch long and extends horizontally, each arm terminates between the edges of the inner and outer containers 13 and 14. The open end of each arm 23 is shielded by guide member 25 adapted to direct pulped material ejected from the end of the tube 23 into the outer container 14. Radially inwardly of its end the tubular arm is traversed by a plurality of parallel spaced apart blades 26. Each blade 26 comprise a sheet of 16 guage stainless steel, the blades are spaced apart by ⅛ inch.

The blades 26 are angled towards the leading side of the tubular arm 23; an aperture 27 is provided in the said leading side of the tubular arm adjacent the radially outer end of the blade. The aperture 27 is shielded by guide member 28 which directs stones ejected through the aperture 27 into the inner container.

A lid 29 is provided to surround the container 16 and extend radially outwardly to a position beyond the edges of the outer container 14. The inner container 13 is provided with outlet spout 31 while the outer container 14 is provided with outlets 32. Buckets 33 are provided below spout 31 and outlets 32.

In operation stone fruit, say cherries, are fed from the hopper 12 into the receptacle 16. The rotation of the receptacle 16 will fling the cherries into one or other of the tubular arms 23. As the cherries pass along the arms 23 they will be forced against the trailing side of the arm by Coriolis forces due to the increased tangential velocity of the tube at increasing distances from the axis of rotation. When the cherries strike the blades 26 the flesh of the fruit is torn from the stone by the centrifugal forces applied to the fruit. The flesh will be pulped by the cutting action of the blades 26 as well as by the force of the impact of the fruit against the blades. The pulped fruit leaves the tubes 23 through the open end thereof and are deflected into the outer container by guide members 25. The stones of the cherries are directed by the blades 26 under the impetus of centrifugal forces, and against the weaker Coriolis forces, out of the aperture 27 and, guided by guide member 28, into the inner container 13.

What is claimed is:
1. An apparatus for slicing and destoning stone fruit comprising:
   a receptacle for receiving the fruit having a base, at least one side wall and an opening in the top thereof, said receptacle being rotatable about a vertically extending axis,
   a tubular body opening into the side wall of said receptacle and extending radially of the axis of rotation of said receptacle, said tubular body being rotatable with said receptacle such that said tubular body has a leading and a trailing edge,
   a plurality of spaced apart blades mounted within and extending across said tubular body intermediate the ends thereof, the longitudinal axis of said blades being angled relative to the longitudinal axis of said tubular body outwardly towards the leading edge of the tubular body, there terminating in a leading edge of said blades
   structure defining an aperture in the leading edge of said tubular body adjacent, and radially inwardly of, the leading edge of said blades, and
   means for rotating said receptacle and tubular body whereby said fruit moves from said receptacle into said tubular body where the fruit is sliced by said blades and projected from the end of said tubular body and the fruit stones are projected from the aperture in said tubular body.

2. The apparatus of claim 1 and further comprising:
   a plurality of tubular bodies opening into the side wall of the said receptacle and extending radially of the axis of rotation of said receptacle, each said tubular body comprising spaced apart blades mounted within and extending across said tubular body intermediate the ends thereof, the longitudinal axis of the blades being angled, relative to the longitudinal axis of said tubular body, outwardly toward the leading edge of said tubular body and an aperture in the leading edge of said tubular body adjacent, and radially inwardly of, the leading edge of the blades.

3. The apparatus of claim 2 and further comprising:
   a first container disposed beneath the path of the aperture in said tubular member as said tubular member rotates with said receptacle whereby the fruit stones projected through said aperture are collected, and
   a second container disposed beneath the path of the outer opening in said tubular body as said tubular body rotates for receiving the sliced fruit projected from the radially outer end of said tubular body.

4. The apparatus of claim 3 and further comprising guide means attached to said tubular member adjacent the aperture in the leading edge of said tubular member for guiding stones projected from the aperture into said first container.

5. The apparatus of claim 1 wherein said rotation means rotates said receptacle and tubular body at a rate of from 1,000 to 2,000 RPM.

6. The apparatus of claim 1 wherein said knife blades are spaced parallel extending across the opening of said tubular body.

* * * * *